United States Patent
Sarda-Mantri et al.

(10) Patent No.: US 10,988,669 B2
(45) Date of Patent: Apr. 27, 2021

(54) USE OF BERBERINE AS CORROSION INHIBITOR IN WELL OPERATIONS

(71) Applicant: Halliburton Energy Services, Inc., Houston, TX (US)

(72) Inventors: Anjali Ramesh Sarda-Mantri, Pune (IN); Sushant Dattaram Wadekar, Pune (IN)

(73) Assignee: Halliburton Energy Services, Inc., Houston, TX (US)

( * ) Notice: Subject to any disclaimer, the term of this patent is extended or adjusted under 35 U.S.C. 154(b) by 203 days.

(21) Appl. No.: 15/519,788

(22) PCT Filed: Dec. 9, 2014

(86) PCT No.: PCT/US2014/069360
§ 371 (c)(1),
(2) Date: Apr. 17, 2017

(87) PCT Pub. No.: WO2016/093807
PCT Pub. Date: Jun. 16, 2016

(65) Prior Publication Data
US 2017/0267913 A1  Sep. 21, 2017

(51) Int. Cl.
*C23C 22/48* (2006.01)
*C09K 8/54* (2006.01)
(Continued)

(52) U.S. Cl.
CPC ............... *C09K 8/54* (2013.01); *C09K 8/68* (2013.01); *C09K 8/74* (2013.01); *E21B 41/02* (2013.01); *C09K 2208/32* (2013.01)

(58) Field of Classification Search
None
See application file for complete search history.

(56) References Cited

U.S. PATENT DOCUMENTS

| | | | |
|---|---|---|---|
| 5,305,832 A | * | 4/1994 | Gupta ..................... C08L 5/14 166/300 |
| 8,404,157 B2 | | 3/2013 | Cassidy et al. |

(Continued)

FOREIGN PATENT DOCUMENTS

| CN | 1749434 | * | 3/2006 | ............... C23G 1/06 |
|---|---|---|---|---|
| CN | 101082133 | * | 12/2007 | ............... C23G 5/02 |

(Continued)

OTHER PUBLICATIONS

Lin et al. "Use of HPHT Autoclave to Determine Corrosion Inhibition by Berberine Extract on Carbon Steels in 3.5% NaCl Solution Saturated with CO2", international Journal of Electrochemical Science, 10, p. 194-208, Published Nov. 17, 2014 (Year: 2014).*

(Continued)

*Primary Examiner* — Lois L Zheng
(74) *Attorney, Agent, or Firm* — Thomas Rooney; C. Tumey Law Group PLLC

(57) ABSTRACT

A variety of methods and compositions are disclosed, including, in one embodiment, a method of inhibiting corrosion of a metal surface in a wellbore, comprising: providing a treatment fluid comprising a corrosion inhibitor, wherein the corrosion inhibitor comprises berberine; and introducing the treatment fluid into a wellbore.

20 Claims, 1 Drawing Sheet

(51) Int. Cl.
   *C09K 8/68*   (2006.01)
   *C09K 8/74*   (2006.01)
   *E21B 41/02*  (2006.01)
   *C23C 22/50*  (2006.01)

(56) References Cited

U.S. PATENT DOCUMENTS

| | | |
|---|---|---|
| 8,716,199 B2 | 5/2014 | Cassidy et al. |
| 2012/0238479 A1 | 9/2012 | Choudhary et al. |
| 2013/0014951 A1 | 1/2013 | Fitzpatrick |

FOREIGN PATENT DOCUMENTS

| | | |
|---|---|---|
| WO | 2005054544 | 6/2005 |
| WO | 2006021741 | 3/2006 |
| WO | 2014070319 | 9/2013 |
| WO | 2014112965 | 7/2014 |

OTHER PUBLICATIONS

Berberine as an Environmental-Friendly Inhibitor for Hot-Dip Coated Steels in Diluted Hydrochloric Acid by Hong Ju et al. dated Feb. 20, 2012.
Wikipedia page on Berberine last modified on Aug. 30, 2014.
Green Inhibitors for Corrosion Protection of Metals and Alloys: An Overview by Amitha Rani et al dated Jun. 17, 2011.
Berbeine as an Effective Corrosion Inhibitor for 7075 Aluminium Alloy in 3.5% NaCl Solution by Ambrish Singh et al dated Jun. 16, 2014.
International Search Report and Written Opinion for Application No. PCT/US2014/069360 dated Aug. 25, 2015.

\* cited by examiner

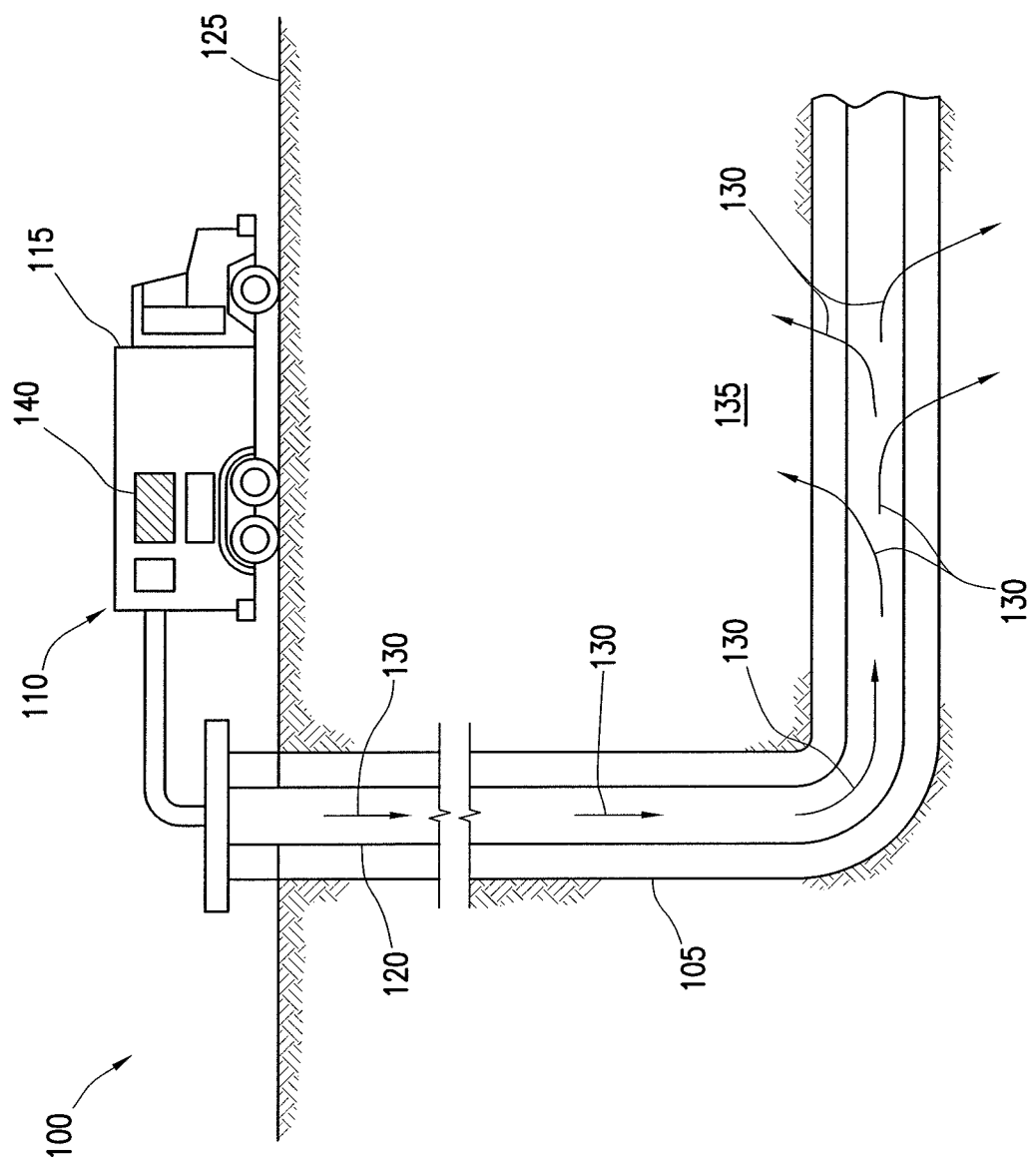

USE OF BERBERINE AS CORROSION INHIBITOR IN WELL OPERATIONS

BACKGROUND

The present invention relates to inhibiting the corrosion of metal surfaces and, more particularly, to use of berberine to inhibit the corrosion of metal surfaces by aqueous acids in well operations.

Acidic fluids may be present in a multitude of operations in the oil and chemical industries. In these operations, metal surfaces in piping, tubing, heat exchangers, and reactors may be exposed to acidic fluids. Acidic fluids are often used as a treatment fluid in well operations. Such acidic treatment fluids may be used in, for example, clean-up operations or stimulation operations for oil and gas wells. Acidic stimulation operations may use these treatment fluids in hydraulic fracturing and matrix acidizing treatments. As used herein, the term "treatment fluid" refers to any fluid that may be used in an application in conjunction with a desired function and/or for a desired purpose. The term "treatment" does not imply any particular action by the fluid or any component thereof.

A common problem associated with using acidic treatment fluids in subterranean formations is the corrosion of the tubular goods in the wellbore and the other equipment used to carry out the treatment. As used herein, the term "corrosion" refers to any reaction between a material and its environment that causes some deterioration of the material or its properties. Examples of common types of corrosion include, but are not limited to, the rusting of metal, the dissolution of a metal in an acidic solution, and patina development on the surface of a metal. The expense of repairing or replacing corrosion damaged equipment is high. The corrosion problem may be exacerbated by the elevated temperatures encountered in deeper formations. The increased corrosion rate of the ferrous and other metals making up the tubular goods and other equipment results in quantities of the acidic solution being neutralized before it enters the subterranean formation. The partial neutralization of the acid results in the production of quantities of metal ions which are highly undesirable in the subterranean formation. Acidic treatment fluids may include a variety of acids such as, for example, hydrochloric acid, formic acid, hydrofluoric acid, and the like.

To combat potential corrosion problems, an assortment of corrosion inhibitors has been used to reduce or prevent corrosion to downhole metals and metal alloys with varying levels of success. As used herein, the term "inhibit" and its derivatives refer to lessening the tendency of a phenomenon to occur and/or the degree to which that phenomenon occurs. The term "inhibit" does not imply any particular degree or amount of inhibition. A difficulty encountered with the use, of some corrosion inhibitors, is the limited temperature range over which they may function effectively. In addition, many of the corrosion inhibitors that have been developed for use in well operations may be considered environmentally objectionable. For instance, actylenic compounds, mannich condensation products, unsaturated carbonyl compounds, unsaturated ether compounds, and/or formamide have been used, but may be environmentally objectionable in certain locations.

BRIEF DESCRIPTION OF THE DRAWINGS

These drawings illustrate certain aspects of some of the embodiments of the present invention, and should not be used to limit or define the invention.

The FIGURE illustrates an example system for delivery of treatments fluids into a wellbore.

DETAILED DESCRIPTION

The present invention relates to inhibiting the corrosion of metal surfaces and, more particularly, the use of berberine to inhibit the corrosion of metal surfaces by aqueous acids in well operations.

There may be several potential advantages to the methods and compositions of the corrosion inhibitors disclosed herein, only some of which may be alluded to herein. One of the many potential advantages is that, because berberine is a natural product, the corrosion inhibitors comprising berberine may have the potential for use in locations that are subject to strict environmental regulations, such as the North Sea, Gulf of Mexico etc. In addition, because berberine is a nonhazardous, natural product it should be easier to handle on field locations as well as during transport as compared to some other corrosion inhibitors, such as propargyl alcohol and other corrosion inhibitors containing Mannich base. Especially the accidental release of the chemicals will have lesser impact on the environment. Another potential advantage is that berberine should be widely available at a low cost from various natural sources, including waste materials such as deoiled mustard cake. Yet another potential advantage is that the corrosion inhibitors comprising berberine may be more effective at higher temperatures as compared to other corrosion inhibitors.

For inhibition of corrosion, a corrosion inhibitor comprising berberine may be added to a treatment fluid. The treatment fluid may then be introduced into wellbore such that the corrosion of metal surfaces in the wellbore may be inhibited. The metals that may be protected include, without limitation, steel grade N-80, J-55, P-110, QT800, HS80, and other common oilfield alloys, such as 13Cr, 25Cr, Incoloy 825, and 316L. The treatment fluids may comprise an aqueous component. The corrosion inhibitors may also be used with acidic treatment fluids, which may further comprise an acid.

The corrosion inhibitors may comprise berberine. Berberine is a quaternary ammonium salt from the proterberine group of isoquinoline alkaloids. Berberine may be strongly yellow in color and may typically be found in the roots, rhizomes, stems, bark, and other plant materials of a variety of plants, including, but not limited to, *Hydrastis canadensis* (goldenseal), *Coptis chinensis* (*Coptis* or goldenthread), *Berberis aquifolium* (Oregon grape), *Berberis vulgaris* (barberry), *Brassica nigra* (black mustard), *Brassica juncea* (brown mustard), and *Berberis aristata* (tree turmeric). Berberine has a long history of medicinal use in traditional Chinese medicine and is typically used as a supplement for its anti-inflammatory and anti-diabetic effects.

Berberine may have a long chain of aromatic rings, a nitrogen atom in the ring, and at several places hydrogen atoms attached to carbon may be replaced by different groups. Without being limited by theory, it is believed that the lone pairs of electrons on the oxygen and nitrogen atoms of the berberine form bonds with the electrons on the metal surface. In aqueous solutions, berberine ionizes to release a cation containing negatively charged oxygen atom that helps to increase delocalization of an electron on the nitrogen atom and form a stronger bond with electrons on the metal surface. Berberine may correspond to the following formula:

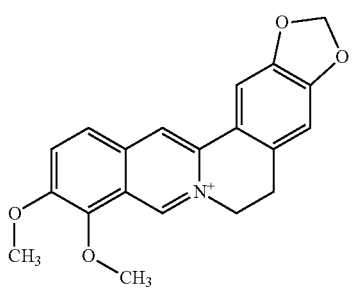

(1)

Any of a variety of different extraction techniques may be used to extract the berberine from the plant materials. The berberine may be extracted from the plant materials using any of a variety of known solvent based leaching techniques. The berberine may be extracted (leached) from the plant materials listed above, including, for example, mustard seed. The berberine may also extracted from plant byproducts, such deoiled mustard cake. Deoiled mustard cake is a left over byproduct from the leaching of mustard oil from mustard seeds. Alternatively, the deoiled mustard cake may be used directly in the treatment fluids without further extraction of the berberine. For example, the deoiled mustard cake may be used in the corrosion inhibitor as a source of the berberine.

The berberine may be present in the treatment fluid in an amount sufficient to provide a desired level of corrosion inhibition. For example, the berberine may be included in an amount of from about 0.01% to about 10% by volume of the treatment fluid and, more particular, from about 0.1% to about 5% by volume of the treatment fluid. One of ordinary skill in the art, with the benefit of this disclosure, should be able to determine the appropriate amount of the berberine to use for a particular application.

The corrosion inhibitor may further comprise a solvent. The solvent may be used, for example, in the extraction/leaching of the berberine. Examples of suitable solvents include, without limitation, methyl alcohol, ethyl alcohol, isopropyl alcohol, ethylene glycol, propylene glycol, dimethyl formamide, N-methyl pyrrolidone, propylene glycol methyl ether and butyl cellosolve. The solvent may be present in an amount in a range of from about 80% to about 99.5% by weight of the corrosion inhibitor.

In addition, the corrosion inhibitors may include one or more quaternary ammonium compounds, one or more corrosion inhibitor intensifiers, and other components commonly utilized in corrosion inhibiting formulations such as acetylenic alcohols, Mannich condensation products formed by reacting an aldehyde, a carbonyl containing compound and a nitrogen containing compound, unsaturated carbonyl compounds, unsaturated ether compounds, formamide, formic acid, formates, other sources of carbonyl, iodides, terpenes, and aromatic hydrocarbons. Combinations of these additional additives may also be used.

The quaternary ammonium compounds which function as corrosion inhibitors and may be used in combination with the berberine may have the general formula:

$$(R)_4N^+X^- \qquad (2)$$

wherein each R is the same or a different group selected from long chain alkyl groups, cycloalkyl groups, aryl groups or heterocyclic groups, and X is an anion such as a halide. The term "long chain" is used herein to mean hydrocarbon groups having in the range of from about 12 to about 20 carbon atoms. Examples of quaternary ammonium compounds which can be included in the corrosion inhibitor compositions of this invention are N-alkyl, N-cycloalkyl and N-alkylarylpyridinium halides such as N-cyclohexylpyridinium bromide or chloride, N-alkyl, N-cycloalkyl and N-alkylarylquinolinium halides such as N-dodecylquinolinium bromide or chloride, and the like. When a quaternary ammonium compound is included, it may be present in an amount in the range of from about 1% to about 45% by weight of the corrosion inhibitor.

Corrosion inhibitor intensifiers may function to strengthen the inhibition action of corrosion inhibitor components such as quaternary ammonium compounds. Examples of such corrosion inhibitor intensifiers which may be utilized include, but are not limited, cuprous iodide; cuprous chloride; antimony compounds such as antimony oxides, antimony halides, antimony tartrate, antimony citrate, alkali metal salts of antimony tartrate and antimony citrate, alkali metal salts of pyroantimonate and antimony adducts of ethylene glycol; bismuth compounds such as bismuth oxides, bismuth halides, bismuth tartrate, bismuth citrate, alkali metal salts of bismuth tartrate and bismuth citrate; iodine; iodide compounds; formic acid; and mixtures of the foregoing intensifiers such as a mixture of formic acid and potassium iodide. When a corrosion inhibitor intensifier is used, it may be present in an amount in the range of from about 0.1% to about 20% by weight of the corrosion inhibitor.

The corrosion inhibitor may be included in the treatment fluids in an amount sufficient to provide a desired level of corrosion inhibition. For example, the corrosion inhibitor may be included in an amount of from about 0.01% to about 10% by volume of the treatment fluid and, more particular, from about 0.1% to about 5% by volume of the treatment fluid. One of ordinary skill in the art, with the benefit of this disclosure, should be able to determine the appropriate amount of the corrosion inhibitor to use for a particular application.

The treatment fluids may comprise an aqueous component. The aqueous component may be from any source provided that it does not contain an excess of compounds that may undesirably affect other components in the treatment fluid. The aqueous component may comprise fresh water or salt water. Salt water generally may include one or more dissolved salts therein and may be saturated or unsaturated as desired for a particular application. Seawater or brines may be suitable for use in some applications. The amount of the aqueous component may typically be dictated by the final concentration of acid desired. With the benefit of this disclosure one of ordinary skill in the art should recognize the appropriate type and amount of the aqueous component for a chosen application.

As previously mentioned, the treatment fluids may further comprise an acid. The acid may comprise organic acids, inorganic acids, derivatives thereof, precursors thereof, or combinations thereof. Examples of suitable acids include, but are not limited to, hydrochloric acid, hydrofluoric acid, formic acid, lactic acid, phosphoric acid, sulfamic acid, acetic acid, derivatives thereof, and mixtures thereof. As will be appreciated by those of ordinary skill, with the benefit of this disclosure, acid-generating materials may also be used. The acid may be present in the treatment fluids in any suitable amount, including in an amount of from about 0.5% to about 40% by weight of the fluid. Alternatively, the acid may be present in the treatment fluids in an amount of from about 2.5% to about 28% by weight of the fluid. Alternatively, the acid may be present in the treatment fluids in an amount of from about 5% to about 28% by weight of the fluid. Individuals skilled in the art, with the benefit of this disclosure, will be able to select a suitable acid and a suitable concentration thereof for a chosen application. In some instances, the particular concentration used in any particular embodiment depends on what acid is being used, and what percentage of acid is present. Other complex, interrelated factors that may be considered in deciding how much of the acid compound to use include, but are not limited to, the composition of the formation, the temperature of the formation, the pressure of the formation, the particular fines and damage present in the formation (e.g., scale, skin, calcium carbonate, silicates, and the like), the particular acid used, metals the acid may contact, corrosion concerns, the expected contact time of the acid with the formation, etc.

As will be appreciated, the treatment fluids may be used in a variety of applications where inhibition of corrosion may be desired, such as acidizing operations. The purpose of acidizing is to dissolve acid-soluble materials to create conductive channels to improve the flow of oil from reservoir into wellbore. An acidic treatment fluid comprising an aqueous component, an acid, and a corrosion inhibitor may be introduced into a subterranean formation by way of a wellbore to dissolve the acid-soluble materials. In this way, oil or gas can more easily flow from the formation into the wellbore. In addition, acidizing can facilitate the flow of injected treatment fluids from the well into the formation.

Acidizing operations may be carried out as acid fracturing procedures or matrix acidizing procedures. In acid fracturing, an acidic treatment fluid may be pumped into a formation at a sufficient pressure to cause fracturing of the formation and to create differential (non-uniform) etching of fracture conductivity. For example, an acidic treatment fluid comprising an aqueous component, an acid, and a corrosion inhibitor may be introduced into the formation to cause fracturing of the formation. Depending on the rock of the formation, the acidizing treatment fluid can etch the fractures faces, whereby flow channels may be formed when the fractures close. The acidic treatment fluid may also enlarge the pore spaces in the fracture faces and in the formation. In matrix acidizing, the acidizing treatment fluid may be injected from the wellbore into the formation at a rate and pressure below the pressure sufficient to create a fracture in the formation.

The type of subterranean formation being treated with the acidic treatment fluids described herein is not believed to be particularly limited. The subterranean formation may comprise a carbonate formation, such as a limestone or dolomite formation, for example. For example, where the acidizing fluid comprises hydrofluoric acid, the subterranean formation may comprise a siliceous formation or have had a siliceous material introduced thereto. Alternatively, the subterranean formation may comprise a sandstone formation or a clay-containing formation. Even further, the subterranean formation may comprise a subterranean formation having a low permeability, such as a shale formation, for example. Moreover, the subterranean formation may comprise native minerals such as, for example, authigenic or detrital minerals, particularly layered aluminosilicates, feldspathic minerals, or purely siliceous minerals.

A method of inhibiting corrosion of a metal surface in a wellbore may comprise providing a treatment fluid comprising a corrosion inhibitor, wherein the corrosion inhibitor comprises berberine; and introducing the treatment fluid into a wellbore. The treatment fluid may be introduced into the wellbore at a rate and pressure sufficient to fracture a subterranean formation surrounding the wellbore. The treatment fluid may contact a metal surface in the wellbore. The treatment fluid may be introduced into the wellbore by pumping the treatment fluid from a fluid supply, through a tubular, and into a subterranean formation surrounding the wellbore. The berberine in the treatment fluid may be an extract of a plant material selected from the group consisting of *Hydrastis canadensis, Coptis chinensis, Berberis aquifolium, Berberis vulgaris, Brassica nigra, Brassica juncea, Berberis aristata*, and combinations thereof. Deoiled mustard cake may be present in the corrosion inhibitor as a source of the berberine. The berberine may be present in the treatment fluid in an amount of from about 0.1% to about 10% by volume of the treatment fluid. The corrosion inhibitor further may further comprise a solvent selected from the group consisting of methyl alcohol, ethyl alcohol, isopropyl alcohol, ethylene glycol, propylene glycol, dimethyl formamide, N-methyl pyrrolidone, propylene glycol methyl ether and butyl cellosolve, and combinations thereof. The treatment fluid further may comprise an aqueous component and an acid. The acid may be selected from the group consisting of hydrochloric acid, hydrofluoric acid, formic acid, lactic acid, phosphoric acid, sulfamic acid, acetic acid, derivatives thereof, precursors thereof, and mixtures thereof.

A treatment fluid may comprise an aqueous component; and a corrosion inhibitor, wherein the corrosion inhibitor comprises berberine. The berberine in the treatment fluid may be an extract of a plant material selected from the group consisting of *Hydrastis canadensis, Coptis chinensis, Berberis aquifolium, Berberis vulgaris, Brassica nigra, Brassica juncea, Berberis aristata*, and combinations thereof. Deoiled mustard cake may be present in the corrosion inhibitor as a source of the berberine. The berberine may be present in the treatment fluid in an amount of from about 0.1% to about 10% by volume of the treatment fluid. The corrosion inhibitor further may further comprise a solvent selected from the group consisting of methyl alcohol, ethyl alcohol, isopropyl alcohol, ethylene glycol, propylene glycol, dimethyl formamide, N-methyl pyrrolidone, propylene glycol methyl ether and butyl cellosolve, and combinations thereof. The treatment fluid further may comprise an aqueous component and an acid. The acid may be selected from the group consisting of hydrochloric acid, hydrofluoric acid, formic acid, lactic acid, phosphoric acid, sulfamic acid, acetic acid, derivatives thereof, precursors thereof, and mixtures thereof.

A system for introducing a treatment fluid into a wellbore may comprise a fluid supply containing the treatment fluid, wherein the treatment fluid comprises a corrosion inhibitor, wherein the corrosion inhibitor comprises berberine; and a tubular in a wellbore in a subterranean formation, wherein the tubular is in fluid communication with the fluid supply. The berberine in the treatment fluid may be an extract of a plant material selected from the group consisting of *Hydrastis canadensis, Coptis chinensis, Berberis aquifolium, Berberis vulgaris, Brassica nigra, Brassica juncea, Berberis aristata*, and combinations thereof. Deoiled mustard cake may be present in the corrosion inhibitor as a source of the berberine. The berberine may be present in the treatment fluid in an amount of from about 0.1% to about 10% by volume of the treatment fluid. The corrosion inhibitor further may further comprise a solvent selected from the group consisting of methyl alcohol, ethyl alcohol, isopropyl alcohol, ethylene glycol, propylene glycol, dimethyl formamide, N-methyl pyrrolidone, propylene glycol methyl ether and butyl cellosolve, and combinations thereof. The treatment fluid further may comprise an aqueous component and an acid. The acid may be selected from the group consisting of hydrochloric acid, hydrofluoric acid, formic acid, lactic acid, phosphoric acid, sulfamic acid, acetic acid, derivatives thereof, precursors thereof, and mixtures thereof.

Turning now to the FIGURE, an example system 100 for introduction of treatment fluids described herein into a wellbore 105 is shown. As depicted in the FIGURE, system 100 may include an injection system 110 which may include a pump truck 115, a wellbore 105, a tubular 120, and other equipment. In the illustrated embodiment, pump truck 115 is above the surface 125 while wellbore 105 and tubular 120 are below the surface 125. Injection system 110 can be configured as shown in the FIGURE or in a different manner, and may include additional or different features as appropriate. Injection system 110 may be deployed via skid equipment, marine vessel deployed or may be comprised of sub-sea deployed equipment.

As illustrated in the FIGURE, wellbore 105 may include vertical and horizontal sections and a treatment fluid 130 may be introduced into subterranean formation 135 surrounding the horizontal portion of the wellbore 105. Generally, a wellbore may include horizontal, vertical, slanted, curved, and other types of wellbore geometries and orientations, and the treatment fluid 130 may generally be applied to subterranean formation 135 surrounding any portion of wellbore 105. Wellbore 105 may include a casing that is cemented or otherwise secured to the wellbore wall. Wellbore 105 can be uncased or include uncased sections. Perforations can be formed in the casing to allow treatment fluids and/or other materials to flow into subterranean formation 135. Perforations can be formed using shape charges, a perforating gun, and/or other tools.

Pump truck 115 may include mobile vehicles, immobile installations, skids, hoses, tubes, fluid tanks or reservoirs, pumps, valves, and/or other suitable structures and equipment. Pump truck 115 may supply treatment fluid 130 from a fluid supply 140, which may include tank, reservoir, connections to external fluid supplies, and/or other suitable structures and equipment. Pump truck 115 may be coupled to tubular 120 to communicate treatment fluid 130 into wellbore 105.

The tubular 120 may include coiled tubing, sectioned pipe, and/or other structures that communicate fluid through wellbore 105. Alternatively, tubular may include casing, liners, or other tubular structures disposed in wellbore 105. Tubular 120 may include flow control devices, bypass valves, ports, and or other tools or well devices that control a flow of fluid from the interior of tubular 120 into subterranean formation 135. For example, tubular 120 may include ports to communicate treatment fluid 130 directly into the rock matrix 106, and/or the working string 104 may include ports that are spaced apart from the wellbore wall to communicate the treatment fluid 108 into an annulus in the wellbore between the working string 104 and the wellbore wall. Although the FIGURE shows the horizontal section of the tubular 120 represents an inner tubular structure of well system 100, in some embodiments, such inner tubular structure may be absent.

Injection system 110 may also include surface and downhole sensors (not shown) to measure pressure, rate, temperature and/or other parameters of treatment. Injection system 110 may include pump controls and/or other types of controls for starting, stopping and/or otherwise controlling pumping as well as controls for selecting and/or otherwise controlling fluids pumped during the injection treatment. An injection control system may communicate with such equipment to monitor and control the injection treatment.

With continued reference to the FIGURE, well system 100 may be used for delivery of treatment fluid 130 into wellbore 105. Treatment fluid 130 may be pumped from fluid supply 140 down the interior of tubular 120 in wellbore 105. Treatment fluid 130 may be allowed to flow down the interior of tubular 120, exit the tubular 120, and finally enter subterranean formation 135 surrounding wellbore 105. Treatment fluid 130 may dissolve acid soluble portions of subterranean formation 135. Treatment fluid 130 may also enter subterranean formation 135 at a sufficient pressure to cause fracturing of subterranean formation 135.

It is also to be recognized that the disclosed treatment fluids may also directly or indirectly affect the various downhole equipment and tools that may come into contact with the treatment fluids during operation. Such equipment and tools may include, but are not limited to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like. Any of these components may be included in the systems generally described above and depicted in FIG. 1.

EXAMPLES

To facilitate a better understanding of the present invention, the following examples of certain aspects of some embodiments are given. In no way should the following examples be read to limit, or define, the entire scope of the invention.

Example 1

Berberine was extracted from mustard seeds in accordance with the following procedure. Approximately 10 grams of mustard seeds were crushed using a mortar and pestle and roasted at 60° C. for 2 hours in a convection oven. Lipids present in the crushed-roasted mustard seeds were extracted in three sequential washing with hexane (100 ml each) to provide a deoiled mustard powder. The deoiled mustard powder was washed three times with ethanol (100 ml each). The residual ethanol from the washing was collected and combined. The extract was distilled out of the ethanol using a rotary evaporator to obtain a crude berberine extract. The crude berberine extract was a yellow, colored liquid residue concentrated in berberine. The mustard seed yielded approximately 7% (w/w) crude Berberine extract.

Example 2

Corrosion inhibition testing was performed on the crude berberine extract obtained in Example 1. Corrosion weight-loss tests were performed as follows. All weight-loss tests were performed in Hastelloy B autoclaves. Test fluids were prepared by addition of the corrosion inhibitor and corrosion inhibitor intensifier to deionized water followed by addition of concentrated hydrochloric acid necessary to give the final weight percent of acid. A pre-weighted metal coupon (alloy specimen for corrosion test) cut from P-110 alloy was immersed in 100 ml of the test fluid in a glass container. The container with the test fluid and corrosion coupon were placed in an autoclave, which was closed, then pressurized with nitrogen to 1,000 psi, and finally heated to a test temperature. The test duration was the total amount of contact time of the test fluid on the corrosion coupon including the 75 minutes of heat ramp up at start of the test and 15 minutes of cooling time at end of the test. At the end of the test time, the corrosion coupon was removed from the test fluid, then cleaned with acetone and a light brushing to remove surface deposits, dried, and then weighed.

The test fluid used for Test No. 1 was a 15% hydrochloric acid solution by weight that contained the crude berberine extract in an amount of 0.7% gal/Mgal. The test fluid used for Test No. 1 further contained hexamine (0.5% gal/Mgal) and HII-124B™ intensifier (0.36% gal/Mgal) as corrosion inhibitor intensifiers. HII-124B™ intensifier is available from Halliburton Energy Services, Inc., Houston, Tex. The corrosion loss in Test No. 1 was 0.023 lb/ft².

The test fluid used for Test No. 2 was a 15% hydrochloric acid solution by weight that contained hexamine (0.5% gal/Mgal) and HII-124B™ intensifier (0.36% gal/Mgal). Test No. 2 was a control that did not contain any of the corrosion inhibitor. The corrosion loss in Test No. 2 was 0.115 lb/ft².

Table 1 below shows the results of the corrosion weight-loss tests.

TABLE 1

| Test No. | Temp. (° F.) | Time (hr) | Corrosion Inhibitor (gal/Mgal) | Corrosion Inhibitor Intensifier (gal/Mgal) | Acid | Corrosion Loss (lb/ft²) |
|---|---|---|---|---|---|---|
| 1 | 225 | 3 | Crude Berberine Extract (0.7%) | Hexamine (0.5%) HII-124B ™ intensifier (0.36%) | 15% HCl | 0.023 |
| 2 | 225 | 3 | None | Hexamine (0.5%) HII-124B ™ Intensifier (0.36%) | 15% HCl | 0.115 |

Accordingly, Table 1 illustrates that berberine can be used as a corrosion inhibitor. In particular, Table 1 illustrates that the crude berberine extract in conjunction with the corrosion inhibitor intensifiers gives acceptable levels of corrosion loss.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. While compositions and methods are described in terms of "comprising," "containing," "having," or "including" various components or steps, the compositions and methods can also "consist essentially of" or "consist of" the various components and steps. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee.

What is claimed is:

1. A method of inhibiting corrosion of a metal surface in a wellbore, comprising:
   providing a treatment fluid comprising a corrosion inhibitor and an aqueous component, wherein the corrosion inhibitor comprises a deoiled mustard cake as a source of berberine, wherein the aqueous component comprises saltwater; and
   introducing the treatment fluid into a wellbore.

2. A method according to claim 1, wherein the treatment fluid is introduced into the wellbore at a rate and pressure sufficient to fracture a subterranean formation surrounding the wellbore.

3. A method according to claim 1, further comprising contacting the metal surface in the wellbore with the treatment fluid.

4. A method according to claim 1, wherein the introducing the treatment fluid into the wellbore comprises pumping the treatment fluid from a fluid supply, through a tubular, and into a subterranean formation surrounding the wellbore.

5. A method according to claim 1, wherein the berberine is present in the treatment fluid in an amount of from about 0.1% to about 10% by volume of the treatment fluid.

6. A method according to claim 1, wherein the corrosion inhibitor further comprises a solvent selected from the group consisting of methyl alcohol, ethyl alcohol, isopropyl alcohol, ethylene glycol, propylene glycol, dimethyl formamide, N-methyl pyrrolidone, propylene glycol methyl ether and butyl cellosolve, and combinations thereof.

7. A method according to claim 1, wherein the treatment fluid further comprises an acid.

8. A method according to claim 7, wherein the acid is selected from the group consisting of hydrochloric acid, hydrofluoric acid, formic acid, lactic acid, phosphoric acid, sulfamic acid, acetic acid, derivatives thereof, precursors thereof, and mixtures thereof.

9. The method of claim 7, wherein the acid is present in an amount of about 2.5% to about 28% of the treatment fluid.

10. The method of claim 1, wherein the deoiled mustard cake is a plant byproduct from leaching mustard oil from mustard seeds.

11. The method of claim 1, wherein the berberine is present in the treatment fluid in an amount of from about 0.1% to about 5% by volume of the treatment fluid.

12. The method of claim 1, wherein the treatment fluid further comprises one or more corrosion inhibitor intensifiers.

13. The method of claim 12, wherein the one or more corrosion inhibitor intensifiers comprise of cuprous iodide; cuprous chloride; antimony compounds such as antimony oxides, antimony halides, antimony tartrate, antimony citrate, alkali metal salts of antimony tartrate and antimony citrate, alkali metal salts of pyroantimonate and antimony adducts of ethylene glycol; bismuth compounds such as bismuth oxides, bismuth halides, bismuth tartrate, bismuth citrate, alkali metal salts of bismuth tartrate and bismuth citrate; iodine; iodide compounds; formic acid, and combinations thereof.

14. The method of claim 12, wherein the one or more corrosion inhibitor intensifiers comprises at least hexamine.

15. A treatment fluid comprising:
   an aqueous component, wherein the aqueous component comprises saltwater; and
   a corrosion inhibitor, wherein the corrosion inhibitor comprises a deoiled mustard cake as a source of berberine.

16. A treatment fluid according to claim 15, wherein the berberine is present in the treatment fluid in an amount of from about 0.1% to about 10% by volume of the treatment fluid.

17. A treatment fluid according to claim 15, wherein the corrosion inhibitor further comprises a solvent selected from the group consisting of methyl alcohol, ethyl alcohol, isopropyl alcohol, ethylene glycol, propylene glycol, dimethyl formamide, N-methyl pyrrolidone, propylene glycol methyl ether and butyl cellosolve, and combinations thereof.

18. A treatment fluid according to claim 15, wherein the treatment fluid further comprises an acid selected from the group consisting of hydrochloric acid, hydrofluoric acid, formic acid, lactic acid, phosphoric acid, sulfamic acid, acetic acid, derivatives thereof, precursors thereof, and mixtures thereof.

19. A system for introducing a treatment fluid into a wellbore, comprising:
   a fluid supply containing the treatment fluid, wherein the treatment fluid comprises a corrosion inhibitor and an aqueous component, wherein the corrosion inhibitor comprises a deoiled mustard cake as a source of berberine, and wherein the aqueous component comprises saltwater; and
   a tubular in a wellbore in a subterranean formation, wherein the tubular is in fluid communication with the fluid supply.

20. A system according to claim 19, wherein the treatment fluid further comprises an acid selected from the group consisting of hydrochloric acid, hydrofluoric acid, formic acid, lactic acid, phosphoric acid, sulfamic acid, acetic acid, derivatives thereof, and mixtures thereof.

* * * * *